Figure 3:
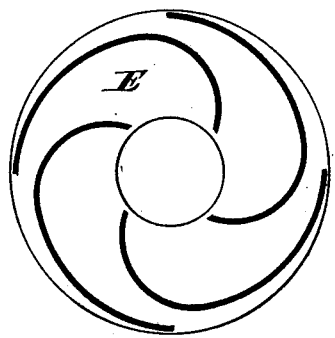

2 Sheets—Sheet 1.
T. WALSH.
Rotary Water-Meter
No. 200,676. Patented Feb. 26, 1878.
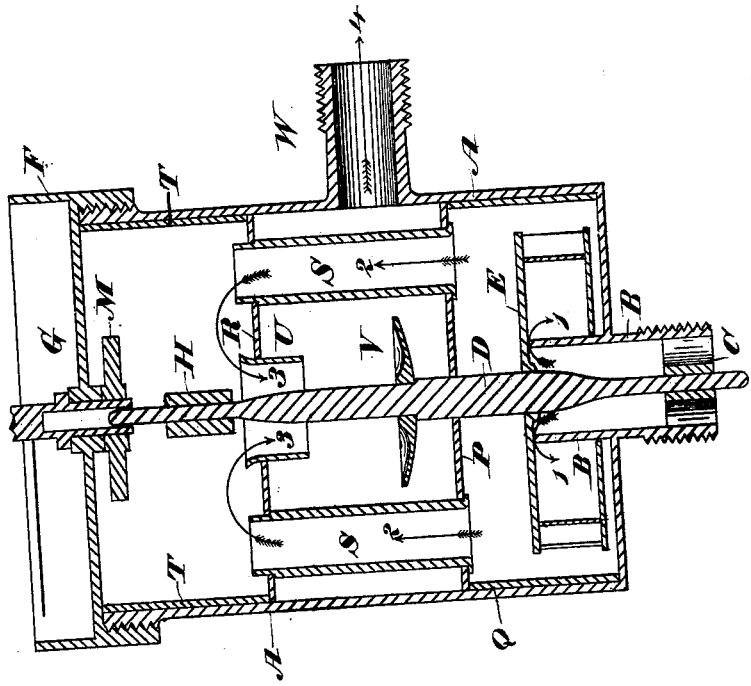
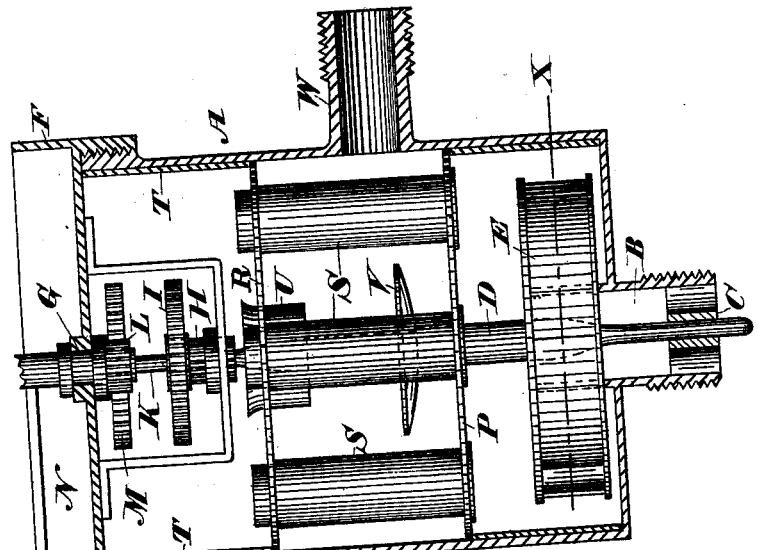
Witnesses: Charles G. Simpson, Jno. A. Rennie
Inventor: Thomas Walsh 2 Sheets—Sheet 2.

T. WALSH.
Rotary Water-Meter.

No. 200,676. Patented Feb. 26, 1878.

Witnesses.

Inventor:
Thomas Walsh

UNITED STATES PATENT OFFICE.

THOMAS WALSH, OF MONTREAL, QUEBEC, CANADA.

IMPROVEMENT IN ROTARY WATER-METERS.

Specification forming part of Letters Patent No. 200,676, dated February 26, 1878; application filed November 9, 1877.

*To all whom it may concern:*

Be it known that I, THOMAS WALSH, of the city and district of Montreal, Province of Quebec, Canada, have invented certain new and useful Improvements in Water-Meters; and I do hereby declare that the following is a full, clear, and exact description of the same.

This invention has reference to the improved construction of water-meters, arranging them so that the stream of water entering the meter forms a cushion upon which a reaction-wheel for measuring the water passing through the meter rests, thus reducing the friction of the wheel to the minimum, thereby enabling the meter to act with greater accuracy, especially where the stream is small, this cushioning being on the under side of said wheel.

My invention also provides a cushion of water on the upper side of the wheel, to prevent it from being thrown (when the pressure of the incoming stream is great) to a greater height than that due to the incoming stream, thus causing a greater degree of accuracy in the action of the meter under the varying volumes of flows of water it may be required to measure.

In the drawings hereunto annexed similar letters of reference indicate like parts.

Figure 4:
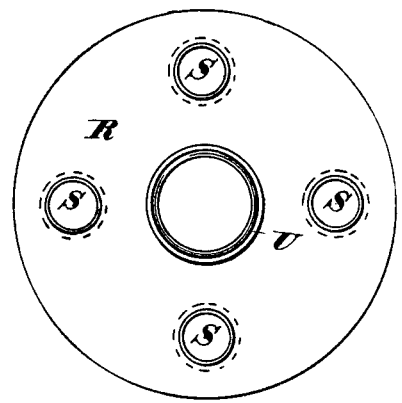

Figure 1 is a section elevation embodying my invention, the case of the water-meter being shown in section, while the inner parts are shown in elevation. Fig. 2 is a section of Fig. 1, all the parts being shown in section. Fig. 3 is a section of reaction-wheel on line X in Fig. 1. Fig. 4 is a plan of upper diaphragm, &c.

Letter A is the case of the meter, preferably made cylindrical for convenience of construction. B is a projection of the case A, for attaching the inlet-pipe, by which the water is brought to the meter. This projection extends up within the meter, as shown in Fig. 1, and more clearly in Fig. 2. It is provided with a guide, C, for holding the lower end of the spindle D, on which is secured the reaction-wheel E.

F is the cap of the meter, which is secured by screwing the two together, or attaching them in any other desired manner, to hold the one concentric with the other, and to form a water-tight joint. In the center of the cap F a guide, G, is formed for holding the upper end of the spindle D. On the spindle D is secured a toothed pinion, H, intermeshing with a gear-wheel, I, carried on a spindle, K, upon which is secured a pinion, L, intermeshing with a gear-wheel, M, secured on the guide G, and causing the same to revolve, and by having attached to it a finger or pointing-hand, as at N, and a dial placed in the cap F. The number of revolutions made by the wheel E will be indicated by the finger N and dial within the cap F.

I do not claim anything new in the above-described gears, finger, or dial. They are merely referred to to show, in a general way, where the ordinary meter-index gearing will be situated.

P is a diaphragm, placed in the meter A, and held at the required height, as shown, by a distance-piece, Q; or a flange or bead made in one with the case A may be used for this purpose. R is a diaphragm situated, as shown, above the one P. S are pipes, the ends of which are inserted in each of the diaphragms. These not only serve for passages, but also for distance-pieces, securely holding the diaphragms P and R apart. The diaphragms are also made to fit closely to the casing A, but are removable, so that the meter may be taken apart for examination and repairs.

T is a distance-piece placed between the diaphragm R and cap F. U is a sleeve, forming a central opening in the diaphragm R, through the center of which the spindle D passes. V is a dished disk placed on the spindle D. W is the outlet, situated between the diaphragms P and R.

The water, entering by the inlet B, presses on the under surface of the reaction-wheel, and raises it to the required height for the required amount of water to pass. The stream of water thus passing into the wheel E, and by the wheel being provided with an upper plate and lower plate, between which the spiral blades are secured, and from the position of the parts, as shown in the drawing, all the water is compelled, practically speaking, to pass between the spiral blades, having no other outlet, and as the orifice of the wheel for the escape of water from it is not changed by its being raised or lowered upon the ends of the inlet B, its revolutions are governed by the velocity of the water passing through it, and thus a better action of the wheel E is insured—that is to say, causing it to revolve, thus indicating by the number of revolutions the amount of water that passes through the wheel, and consequently through the meter.

The water first passes as indicated by the arrows 1 in Fig. 2, the edge on the top of the projection B being faced off to a true surface; and the part of the surface of the wheel E resting upon it is also trued, the two forming a ground joint together. Therefore the wheel E must be raised from its seat upon the projection B, to enable the water to pass into the wheel, thus forming a cushion (for the wheel on its lower side) of water. From thence the water rises in the meter. In doing this it passes, as indicated by the arrows 2, through the tubes S into the upper part of the meter, passing, as indicated by the arrows 3, through the sleeve U, and falling upon the dished disk V, by which it is distributed, and passes off through the outlet W.

The above-mentioned falling or pressing of the flow of water on the dished disk V forms a cushion on the upper side, preventing the wheel E from rising too great an amount.

Although four pipes, S, are shown, their number may be increased or diminished, as desired.

What I claim as my invention is as follows:

1. The combination of the wheel E, having its vanes or spirals arranged to be inclosed between the upper and lower plates of said wheel, arranged as set forth, whereby a uniform orifice for the flow and escape of the water is formed at the periphery of said wheel, with inlet B, arranged to cause the flow of water into the meter to form a fluid cushion to the wheel E, substantially as described.

2. The combination of the inlet-pipe B, wheel E, having spindle D and dished disk V, and sleeve U, substantially as and for the purposes set forth.

3. The combination of the inlet B, wheel E, having spindle D and disk V, diaphragms P and R, sleeve U, and pipes S, substantially as and for the purposes set forth.

Montreal, 5th day of November, A. D. 1877.

THOMAS WALSH.

Witnesses:
   CHARLES G. C. SIMPSON,
   JNO. A. RENNIE.